(12) United States Patent
Smith

(10) Patent No.: US 6,710,952 B1
(45) Date of Patent: *Mar. 23, 2004

(54) SYSTEM AND METHOD FOR GRACEFULLY RELINQUISHING A COMPUTER HARD DISK DRIVE FROM IMMINENT CATASTROPHIC FAILURE

(75) Inventor: Gordon James Smith, Rochester, MN (US)

(73) Assignee: Hitachi Global Storage Technologies Netherlands, B.V., Amsterdam (NL)

( * ) Notice: Subject to any disclaimer, the term of this patent is extended or adjusted under 35 U.S.C. 154(b) by 0 days.

This patent is subject to a terminal disclaimer.

(21) Appl. No.: 09/487,912

(22) Filed: Jan. 19, 2000

(51) Int. Cl.[7] .......................... G11B 27/36; G11B 21/02
(52) U.S. Cl. ................ 360/31; 360/75; 360/780.06; 360/73.03
(58) Field of Search ........................ 360/25, 31, 75, 360/97.02, 97.03, 97.04, 69, 73.03, 78.06

(56) References Cited

U.S. PATENT DOCUMENTS

| | | | | |
|---|---|---|---|---|
| 4,381,528 A | * | 4/1983 | Fujioka | 360/97.02 |
| 5,666,237 A | * | 9/1997 | Lewis | 360/75 |
| 5,689,329 A | * | 11/1997 | Rose | 356/72 |
| 5,764,430 A | * | 6/1998 | Ottesen et al. | 360/73.03 |
| 6,011,666 A | * | 1/2000 | Wakamatsu | 360/69 |
| 6,067,203 A | * | 5/2000 | Ottesen et al. | 360/73.03 |
| 6,097,559 A | * | 8/2000 | Ottesen et al. | 360/31 |
| 6,144,178 A | * | 11/2000 | Hirano et al. | 318/476 |

* cited by examiner

Primary Examiner—Andrew L. Sniezek
(74) Attorney, Agent, or Firm—Robert O. Guillot; IPLO Intelelctual Property Law Offices

(57) ABSTRACT

A computer hard disk drive has a drive controller that monitors the condition of the head-disk interface within the drive. The drive normally operates under ambient or relatively low internal pressure. However, when the drive is in imminent risk for a head-disk interface failure, the drive is pressurized to allow the air bearing surfaces of the heads to achieve a greater flying height above the surfaces of their respective disks, thereby delaying the onset of a catastrophic head-disk interface failure. In addition, the spindle rotation rate and/or the slider head access rate are decreased to avoid hastening the imminent failure. Measurements of the condition and stability of the head-disk interface inside the drives are made by monitoring data error rates, head flying height, and other performance variables.

11 Claims, 2 Drawing Sheets

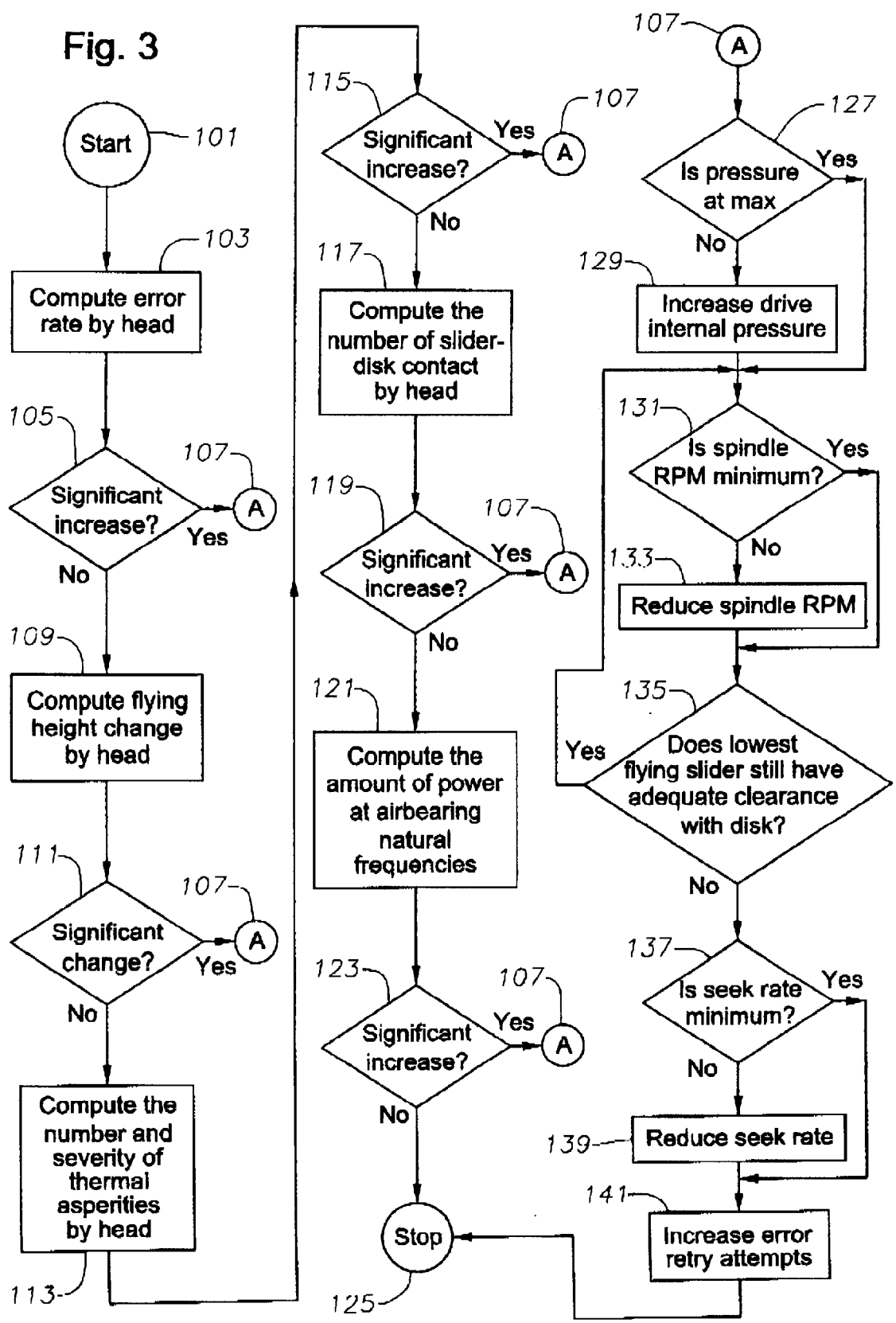

SYSTEM AND METHOD FOR GRACEFULLY RELINQUISHING A COMPUTER HARD DISK DRIVE FROM IMMINENT CATASTROPHIC FAILURE

BACKGROUND OF THE INVENTION

1. Technical Field

This invention relates in general to an improved computer hard disk drive and in particular to avoiding catastrophic failure in a disk drive as long as possible. Still more particularly, the invention relates to a system and method for gracefully relinquishing a disk drive that is on the brink of catastrophic failure in order to transfer data from the failing drive to another storage medium.

2. Description of the Prior Art

Generally, a digital data access and storage system consists of one or more storage devices that store data on storage media such as magnetic or optical data storage disks. In magnetic disk storage systems, a storage device is called a hard disk drive (HDD), which includes one or more hard disks and an HDD controller to manage local operations concerning the disks. Hard disks are rigid platters, typically made of aluminum alloy or a mixture of glass and ceramic, covered with a magnetic coating. Typically, two or three platters are stacked vertically on a common spindle that is turned by a disk drive motor at several thousand revolutions per minute (rpm).

The only other moving part within a typical HDD is the head assembly. Within most drives, one read/write head is associated with each side of each platter and flies just above or below the platter's surface. Each read/write head is connected to a semi-rigid arm apparatus which supports the entire head flying unit. More than one of such arms may be utilized together to form a single armature unit.

Each read/write head scans the hard disk platter surface during a "read" or "write" operation. The head/arm assembly is moved utilizing an actuator which is often a voice coil motor (VCM). The stator of a VCM is mounted to a base plate or casting on which is also mounted the spindle supporting the disks. The base casting is in turn mounted to a frame via a compliant suspension. When current is fed to the motor, the VCM develops force or torque which is substantially proportional to the applied current. The arm acceleration is therefore substantially proportional to the magnitude of the current. As the read/write head nears the desired track, a reverse polarity signal is applied to the actuator, causing the signal to act as a brake, and ideally causing the read/write head to stop directly over the desired track.

In rare circumstances, a disk drive will have a catastrophic failure wherein the data saved on the disk will be permanently lost and incapable of being retrieved. Unfortunately, prior art disk drives are incapable of delaying the onset of catastrophic failure in order to simultaneously transfer data from the failing drive to another known good drive or other storage medium.

Accordingly, it is an object of the invention to provide an improved computer hard disk drive.

It is an additional object of the invention to avoid catastrophic failure in a disk drive as long as possible.

Still another object of the invention is to provide a system and method for gracefully relinquishing a disk drive that is on the brink of catastrophic failure in order to transfer data from the failing drive to another storage medium.

The foregoing and other objects and advantages of the present invention will be apparent to those skilled in the art, in view of the following detailed description of the preferred embodiment of the present invention, taken in conjunction with the appended claims and the accompanying drawings.

SUMMARY OF THE INVENTION

A computer hard disk drive has a drive controller that monitors the condition of the head-disk interface within the drive. The drive normally operates under ambient or relatively low internal pressure. However, when the drive is in imminent risk for a head-disk interface failure, the drive is pressurized to allow the air bearing surfaces of the heads to achieve a greater flying height above the surfaces of their respective disks, thereby delaying the onset of a catastrophic head-disk interface failure. In addition, the spindle rotation rate and/or the slider head access rate are decreased to avoid hastening the imminent failure. Measurements of the condition and stability of the head-disk interface inside the drives are made by monitoring data error rates, head flying height, and other performance variables.

DESCRIPTION OF THE DRAWINGS

So that the manner in which the features, advantages and objects of the invention, as well as others which will become apparent, are attained and can be understood in more detail, more particular description of the invention briefly summarized above may be had by reference to the embodiment thereof which is illustrated in the appended drawings, which drawings form a part of this specification. It is to be noted, however, that the drawings illustrate only a preferred embodiment of the invention and is therefore not to be considered limiting of its scope as the invention may admit to other equally effective embodiments.

FIG. 3 is a high level, logic flowchart of an illustrative embodiment of the method and system of the present invention utilized by the drive of FIG. 1.

DESCRIPTION OF THE PREFERRED EMBODIMENT

Figure 1:
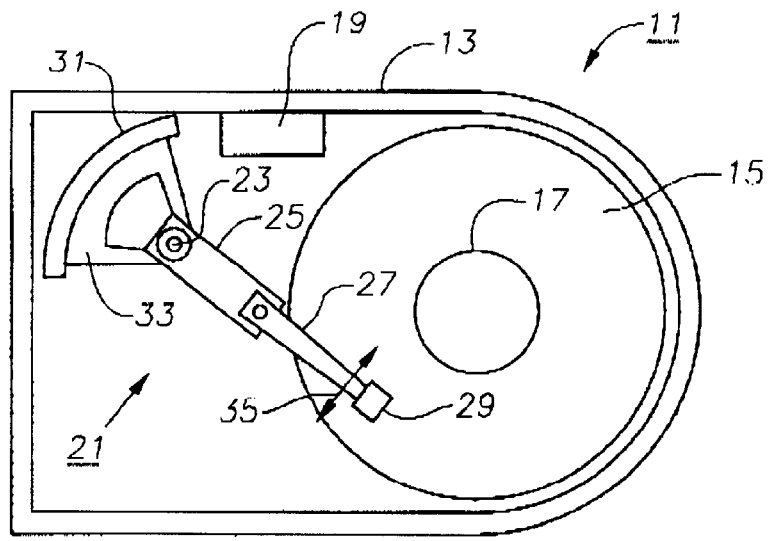
FIG. 1 is a schematic drawing of a computer hard disk drive constructed in accordance with the invention.

Referring to FIG. 1, a schematic drawing of an information storage system comprising a magnetic hard disk file or drive 11 for a computer system is shown. Optimally, drive 11 is included in an array configuration of two or more drives. Drive 11 has an outer housing or base 13 containing a plurality of stacked, parallel magnetic disks 15 (one shown) which are closely spaced apart. Disks 15 are rotated by a motor located therebelow about a central drive hub 17. A plurality of stacked, parallel actuator arms 21 (one shown) are pivotally mounted to base 13 about a pivot assembly 23. A controller 19 is mounted to the base for selectively moving arms 21 relative to disks 15.

In the embodiment shown, each arm 21 comprises a mounting support 25, a pair of parallel, cantilevered load beams or suspensions 27 extending from each mounting support 25, and a head slider assembly 29 having at least one magnetic read/write head secured to each suspension 27 for magnetically reading data from or magnetically writing data to disks 15. Suspensions 27 have a spring-like quality which biases or maintains them in parallel relationship relative to one another. A motor assembly 31 having a conventional voice coil motor is also mounted to pivot assembly 23 opposite head slider assemblies 29. Movement of an actuator driver 33 (indicated by arrow 35) moves head slider assemblies 29 radially across tracks on the disks 15 until the heads on assemblies 29 settle on the target tracks. The head slider assemblies 29 operate in a conventional manner and always move in unison with one another, unless drive 11 uses a split actuator (not shown) wherein the arms move independently of one another.

Figure 2:
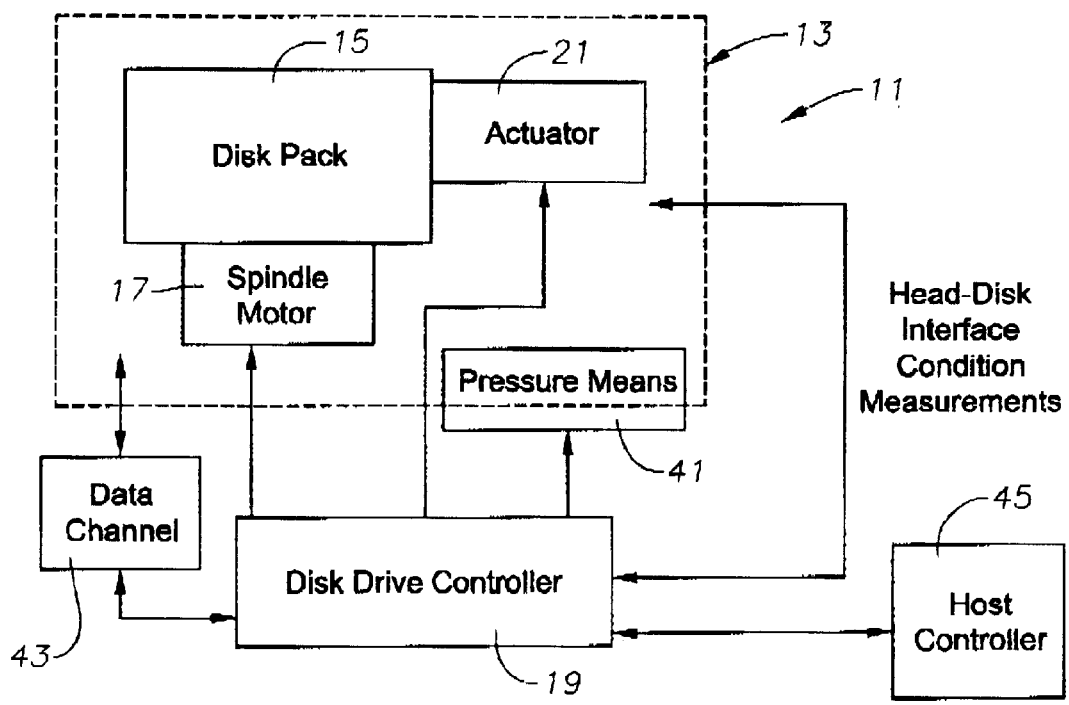
FIG. 2 is a simplified block diagram of the drive of FIG. 1.

Referring now to FIG. 2, a simplified block diagram of a single disk drive 11 with relinquishment features is shown. Drive controller 19 monitors the head-disk interface condition. Drive 11 is preferably sealed and normally operates in an atmosphere at ambient or relatively low internal pressure. However, when one or more disk drives 11 is determined to be at risk for a head crash or some other-head-disk interface failure is imminent, the internal pressure of the troubled drive 11 is increased via pressure means 41 to increase the density of the air inside base 13 to allow the air bearing surfaces of the heads to achieve a greater flying height above the surfaces of their respective disks 15. Pressure means 41 may comprise a number of different devices for selectively manipulating the atmosphere inside base 13 including a compressor, a vacuum pump, or a vessel of pressurized gas. Alternatively, if the interior of base 13 is evacuated at a pressure below that of the ambient atmosphere under normal operating conditions, a vent-type mechanism may be employed to selectively allow the ambient atmosphere to enter the base by ventilation, or similarly pressurized by using the pump, etc. After venting, base 13 may be further pressurized above ambient pressure by other means.

An increased flying height delays the onset of a catastrophic head-disk interface failure. In one embodiment, controller 19 reduces the rotational speed of disks 15 via spindle motor 17 and their rotation rate in order to not accelerate failure. Moreover, the data channel 43 is instructed to increase error recovery attempts and/or other enhanced data recovery operations such as reducing the slider head access rate in order to delay failure. By reducing the access rate, the flying height loss during the seek process is lowered since the radial acceleration is reduced.

Preferably, the change in pressure, spindle rotation rate, and slider head access rate are driven by the rate at which the head-disk interface is degrading as a function of time. Measurements of the condition and stability of the head-disk interface inside the drives can be made by monitoring data error rates, head flying height, the number and severity-of thermal asperities, the number of slider-disk contacts, the amount of power required at precise operating conditions such as air bearing natural frequencies, etc. Thresholds that represent a degraded state are previously set. If a degradation in the condition is detected, controller 19 notifies the host controller 45 that action will be taken to extend the life of drive 11. The decision to take these actions is based on periodic or continuous measurements of the condition of the head-disk interface.

For example, the relinquishing process can be initiated if the head flying height is reduced by approximately 50% or more. The relinquishing process also may be initiated if the dynamic flying height of a head indicates unusual flying characteristics such as head-disk intermittent contact. Once one or more thresholds have been achieved, controller 19 signals the host controller 45 that drive 11 should begin the relinquishment process. Based on the amount of data on the affected drive(s), the current demand for the data on the affected drive(s), and to what extent the head-disk interface has degraded, the controller 19 takes the necessary action to delay any failure.

Referring now to FIG. 3, there is illustrated one embodiment of a high level, logic flow diagram of a method for gracefully relinquishing a hard disk drive in accordance with the invention. The method begins as illustrated at block 101 and proceeds to block 103 where the error rate of each or any head is determined. Next, a determination is made as to whether the error rate of each head has significantly increased, as depicted at block 105. If the error rate increase is significant, the process proceeds to block 107 which will be explained below. If the error rate increase (if any) is insignificant, the change in flying height of the heads is computed, as illustrated at block 109. Next, a determination is made as to whether the change in flying height (if any) is significant. If so, the process again proceeds to block 107. If the change in flying height is insignificant, the process computes the number and severity of the thermal asperities by head, as depicted at block 113.

As illustrated at block 115, another determination is made as to whether the increase (if any) in the number and severity of thermal asperities is significant. If so, the process proceeds to block 107; if not, the process computes the number of slider-disk contacts by head, as depicted at block 117. Yet another determination is made as to whether the number of slider-head contacts has increased significantly (see block 119). If so, the process proceeds to block 107; if not, the process computes the amount of flying height modulation power present at air bearing, suspension, and arm natural frequencies for each head, as illustrated at block 121. An additional determination is made as to whether the increase (if any) in power is significant (depicted at block 123). If the power increase is significant, the process proceeds to block 107; if not, the process terminates since no relinquishment will be required.

Thus, both flying height modulation and radial track misregistration can be monitored. Flying height modulation can be monitored and the power at specific known air bearing, suspension, and arm frequencies can be compared to baseline values that are computed when the disk drive was manufactured. Similarly, radial track misregistration can be monitored by using the actuator servo system. The power at known frequencies that are likely to be excited when a head is in contact with a disk surface is compared to baseline values (where no contact was present). Measuring flying height modulation by using the readback signal amplitude modulation is well known in the art, as is monitoring track misregistration using the servo.

At block 107, the process first makes a determination as to whether the pressure in the base is at the maximum allowable (illustrated at block 127). If the pressure is not maximized, the internal drive pressure is increased, as depicted at block 129. Once the pressure is maximized, the process proceeds to block 131 wherein a determination is made as to whether the spindle rotational speed is minimized. If the spindle rotational speed may be further reduced, it is performed as illustrated at block 133. Once the rotational speed of the spindle is minimized, another determination is made as to whether the lowest flying slider still has adequate clearance relative to its associated disk, as depicted at block 135. If so, the process returns to block 131; if not, the process proceeds to block 137 wherein a determination is made as to whether the seek rate is minimized. If the seek rate is not minimized, it is performed as illustrated at block 139. Once the seek rate is minimized, the process proceeds to block 141 wherein the error retry attempts are increased. If this final exercise is futile the process terminates at block 125.

The invention has several advantages. The present process and apparatus described herein prolong the onset of catastrophic failure in a computer hard disk drive as long as possible. The delay allows at least some of the critical data that is saved on the failing disk to be transferred to a known good drive or an alternate storage medium before it is permanently lost and cannot be retrieved. The present invention uses all available means to delay the failure of the drive, including increasing flying height of the heads, reducing the spindle rotation and/or slider head access rates, and instructing the data channel to increase error recovery attempts or other enhanced data recovery operations.

While the invention has been shown or described in only some of its forms, it should be apparent to those skilled in the art that it is not so limited, but is susceptible to various changes without departing from the scope of the invention.

What is claimed is:

1. A method for gracefully relinquishing a computer hard disk drive from imminent failure, comprising the steps of:
   (a) providing the disk drive with a base, a motor having a rotatable spindle, a plurality of media disks mounted to the spindle in the base, an actuator pivotally mounted in the base with a bead for interacting with each of the disks;
   (b) monitoring conditions and stability of head-disk interfaces in the base;
   (c) sensing a degradation in at least one of the head-disk interfaces such that failure of the drive is imminent; and then
   (d) prolonging the onset of failure of the disk drive by increasing pressure in the base such that a fly height of the heads above the media disks is increased in response to the degradation in said at least one of the head-disk interfaces in order to transfer data saved on the disks to an alternate storage medium before the data is permanently lost and cannot be retrieved from the disks.

2. The method of claim 1 wherein step (d) comprises reducing a rotational speed of the disk and a seek rate in response to the degradation in said at least one of the head-disk interfaces in order to delay failure of the drive.

3. The method of claim 1 wherein step (d) comprises instructing a data channel to increase error recovery attempts in response to the degradation in said at least one of the head-disk interfaces in order to delay failure of the drive.

4. The method of claim 1 wherein step (c) comprises sensing a reduction in a fly height of the head of approximately 50% or more.

5. The method of claim 1 wherein step (c) comprises sensing unusual flying characteristics in the dynamic flying height of the head.

6. The method of claim 1 wherein step (b) comprises monitoring data error rates.

7. The method of claim 1 wherein step (b) comprises monitoring the number and severity of thermal asperities.

8. The method of claim 1 wherein step (b) comprises monitoring the number of slider-disk contacts.

9. The method of claim 1 wherein step (b) comprises monitoring the power required for air bearing flying height modulation at specific frequencies.

10. The method of claim 1 wherein step (a) comprises providing the base with an evacuated atmosphere during normal operation, and wherein step (d) comprises ventilating the base to allow ambient atmosphere to enter the base.

11. The method of claim 10, further comprising the step of increasing the atmosphere of the base above a pressure of the ambient atmosphere.

\* \* \* \* \*